US 8,854,015 B2

(12) United States Patent
Deng

(10) Patent No.: US 8,854,015 B2
(45) Date of Patent: Oct. 7, 2014

(54) CURRENT CONTROLLER AND GENERATOR SYSTEM

(71) Applicant: Heng Deng, Brande (DK)

(72) Inventor: Heng Deng, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/909,198

(22) Filed: Jun. 4, 2013

(65) Prior Publication Data

US 2013/0320936 A1 Dec. 5, 2013

(30) Foreign Application Priority Data

Jun. 5, 2012 (EP) ................................ 12170821

(51) Int. Cl.
| | |
|---|---|
| H02P 11/00 | (2006.01) |
| H02H 7/06 | (2006.01) |
| H02P 9/00 | (2006.01) |
| H02M 1/084 | (2006.01) |
| H02P 21/12 | (2006.01) |
| F03D 9/00 | (2006.01) |
| H02P 9/04 | (2006.01) |

(52) U.S. Cl.
CPC ................. H02P 9/00 (2013.01); H02M 1/084 (2013.01); H02P 21/12 (2013.01)
USPC ............... 322/27; 290/44; 318/802; 363/131; 700/29

(58) Field of Classification Search
CPC ...... F03D 9/003; G05B 11/32; G05B 19/414; G05B 5/01; H02J 3/1842; H02J 3/26; H02J 3/386; H02M 7/49; H02P 2009/004; H02P 2207/073; H02P 9/007; Y02B 70/126; Y02E 10/72; Y02E 10/763; H02K 19/10; H02K 41/025

USPC ............... 322/27; 290/44; 318/802; 363/131; 700/29
See application file for complete search history.

(56) References Cited

U.S. PATENT DOCUMENTS 4,418,308 A * 11/1983 Bose .............................. 318/803
4,967,134 A * 10/1990 Losic et al. .................... 318/802

(Continued)

FOREIGN PATENT DOCUMENTS

TW        201032446 A      9/2010

OTHER PUBLICATIONS

Magueed F. A. et al:"Control of VSC connected to the grid through LCL-filter to achieve balanced currents", Conference record of the 2005 IEEE Industry applications conference forieth IAS annual meeting Oct. 2-6, 2005 Knowloon, Hong Kong, China, ISSS, vol. 1, pp. 572-578, XP010842425, DOI: 10.1109/IAS.2005.1518364, ISBN: 978-0-7803-9208-3, p. 572, paragraph introduction, p. 574, right-hand column, p. 577, paragraph Dual vector collector, figures 1, 12; 2005; Oct. 2, 2005.

(Continued)

Primary Examiner — Pedro J Cuevas

(57) ABSTRACT

A current controller for controlling plural stator currents of plural stator windings of an electrical machine, in particular a generator, is provided, wherein the plural windings are separately connectable to a converter. The current controller includes a positive-sequence current controller configured to provide a first voltage command, in particular in a rotating dq+ frame, based on the plural stator currents; a negative-sequence current controller configured to provide a second voltage command, in particular in the dq+ frame, based on the plural stator currents. Further, the current controller includes a summation system for adding the first voltage command and the second voltage command to obtain a summed voltage command based on which the converter is controllable.

17 Claims, 5 Drawing Sheets

(56) References Cited

U.S. PATENT DOCUMENTS

| | | | |
|---|---|---|---|
| 5,047,915 A * | 9/1991 | Smith et al. | 363/161 |
| 5,225,712 A * | 7/1993 | Erdman | 290/44 |
| 5,384,698 A * | 1/1995 | Jelinek | 700/29 |
| 5,442,544 A * | 8/1995 | Jelinek | 700/29 |
| 5,457,375 A * | 10/1995 | Marcinkiewicz et al. | 318/802 |
| 5,532,575 A * | 7/1996 | Ainsworth et al. | 323/211 |
| 6,496,397 B2 * | 12/2002 | Sakai et al. | 363/131 |
| 6,552,508 B1 * | 4/2003 | Ho et al. | 318/727 |
| 6,690,139 B1 * | 2/2004 | Seibel | 318/798 |
| 6,998,811 B2 * | 2/2006 | Myers et al. | 318/632 |
| 7,095,132 B2 * | 8/2006 | Kikuchi et al. | 290/52 |
| 7,145,262 B2 * | 12/2006 | Kikuchi et al. | 290/44 |
| 7,268,443 B2 * | 9/2007 | Kikuchi et al. | 290/44 |
| 7,423,412 B2 * | 9/2008 | Weng et al. | 322/20 |
| 7,531,910 B2 * | 5/2009 | Flottemesch et al. | 290/44 |
| 7,615,880 B2 * | 11/2009 | Kikuchi et al. | 290/44 |
| 7,804,184 B2 * | 9/2010 | Yuan et al. | 290/44 |
| 7,852,643 B2 * | 12/2010 | Zhang et al. | 363/65 |
| 7,919,879 B2 * | 4/2011 | Flannery et al. | 290/44 |
| 7,939,954 B2 * | 5/2011 | Ruiz Flores et al. | 290/44 |
| 7,966,103 B2 * | 6/2011 | Jorgensen et al. | 700/297 |
| 8,009,450 B2 | 8/2011 | Breitzmann et al. | 363/84 |
| 8,093,741 B2 * | 1/2012 | Ritter et al. | 290/44 |
| 8,207,712 B2 * | 6/2012 | Hasler | 323/208 |
| 8,222,758 B2 * | 7/2012 | Arinaga et al. | 290/44 |
| 8,242,620 B2 * | 8/2012 | Kikuchi et al. | 290/44 |
| 8,253,393 B2 * | 8/2012 | Bo et al. | 322/44 |
| 8,466,573 B2 * | 6/2013 | Kikuchi et al. | 290/44 |
| 8,664,788 B1 * | 3/2014 | Wagoner et al. | 290/44 |
| 8,736,204 B2 * | 5/2014 | Sodo et al. | 318/375 |
| 2001/0043481 A1 * | 11/2001 | Sakai et al. | 363/131 |
| 2003/0062774 A1 * | 4/2003 | Escobar et al. | 307/64 |
| 2005/0017512 A1 * | 1/2005 | Kikuchi et al. | 290/44 |
| 2006/0214429 A1 * | 9/2006 | Kikuchi et al. | 290/44 |
| 2007/0177314 A1 * | 8/2007 | Weng et al. | 361/20 |
| 2007/0278797 A1 * | 12/2007 | Flannery et al. | 290/44 |
| 2008/0007121 A1 * | 1/2008 | Erdman et al. | 307/47 |
| 2008/0018309 A1 * | 1/2008 | Erdman et al. | 322/20 |
| 2008/0073979 A1 * | 3/2008 | Wiegman et al. | 307/84 |
| 2009/0085354 A1 * | 4/2009 | Tan et al. | 290/44 |
| 2009/0212568 A1 | 8/2009 | Maibach | 290/44 |
| 2011/0018281 A1 * | 1/2011 | Tan et al. | 290/55 |
| 2011/0103110 A1 * | 5/2011 | Godridge et al. | 363/74 |
| 2011/0211381 A1 * | 9/2011 | Iwata et al. | 363/132 |
| 2011/0215775 A1 * | 9/2011 | Engelhardt et al. | 323/205 |
| 2012/0069612 A1 * | 3/2012 | Hasler | 363/71 |
| 2012/0235621 A1 * | 9/2012 | Yamada et al. | 318/716 |
| 2013/0016537 A1 * | 1/2013 | Deng | 363/34 |
| 2013/0320938 A1 * | 12/2013 | Deng et al. | 322/90 |
| 2014/0138949 A1 * | 5/2014 | El Moursi et al. | 290/44 |

OTHER PUBLICATIONS

Shih-Feng Chous et al:"A reactive current injection technique for renewable energy converters in low voltage ride-through operations", Power and Energy Society General Meeting, 2011 IEEE, pp. 1-7, XP032055163, DOI: 10.1109/PES.2011.6039096, ISBN: 978-1-4577-1000-1, abstract, p. 1, right-hand column, paragraph two, p. 4, left-hand coulumn, paragraph one, figures 3,4; 2011; Jul. 24, 2011.

Flannery P. S. et al: "Unbalanced Voltage Sag Ride-Through of a Doubly fed Induction Generator Wind Turbine with Series Grid-Side Converter", IEEE Transactions Industry Applications, IEEE Service Center, Piscatway, NJ, US, vol. 45, No. 5, pp. 1879-1887, XP011270488, ISSN: 0093-9994, DOI: 10.1109/TIA.2009.2027540, p. 1882, left-hand column, paragraph top, figure 3; 2009; Sep. 1, 2009.

* cited by examiner

US 8,854,015 B2

CURRENT CONTROLLER AND GENERATOR SYSTEM

CROSS REFERENCE TO RELATED APPLICATIONS

The present application claims priority to European Patent Office Application No. 12170821.8 EP filed Jun. 5, 2012, the entire content of which is hereby incorporated by reference.

FIELD OF INVENTION

The present invention relates to a current controller for controlling plural stator currents of plural stator windings of an electrical machine and to a generator system comprising at least one current controller. The generator system further comprises a generator, in particular a wind turbine generator, which may have unbalanced impedance.

ART BACKGROUND

An electrical AC machine may generate or consume an alternating current power flow. The electrical AC machine may for example be a motor or a generator.

U.S. Pat. No. 8,009,450 B2 discloses a method and apparatus for phase current balance in active converter with unbalanced AC line voltage source, wherein individual phase voltage command values are compensated according to phase line voltage in balances to compensate for converter control to provide balanced phase currents in the present of unbalanced phase supply line voltages. Thereby, the line voltage has a fixed frequency.

There may be a need for a current controller and for a generator system, wherein machine and converter losses are reduced, wherein acoustic noise and vibration of the system are reduced, wherein no additional costs are involved and wherein no changes for the hardware is required.

SUMMARY OF THE INVENTION

According to an embodiment of the present invention it is provided a current controller for controlling plural stator currents (in particular for each electrical phase) of plural stator windings (in particular at least one stator winding for each phase) of a (in particular variable frequency AC) electrical machine, in particular generator, wherein the plural windings are separately connectable to a converter, the current controller comprising: a positive-sequence current controller configured for providing a first voltage command, in particular in a dq-frame, based on the plural stator currents; a negative-sequence current controller configured for providing a second voltage command, in particular in a dq-frame, based on the plural stator currents; a summation system for adding the first voltage command and the second voltage command to obtain a summed voltage command based on which the converter is controllable.

The electrical machine may be in particular a variable frequency AC electrical machine, such as an electromotor or a generator, in particular a generator of a wind turbine. The generator may for example be a synchronous generator, in particular having a rotor with permanent magnets rotating around a stator, in particular comprising two or more stator windings for different phases, such as three phases, and the plural stator currents flow through the plural stator windings. The generator may be an inner rotor generators or outer rotor generators.

The stator may form a full circumference or may be a segmented stator comprising several (physically separated) stator segments. The generator can have multiple electrical-isolated three-phase windings (power output) even though the stator is not a segmented stator.

In most electrical AC machines impedance of the plural stator windings may be balanced. Thus, the machine impedance is equal for different phases, such that the impedance of the plural stator windings is equal or the same. However, under certain conditions the machine impedance may be unbalanced in some special electrical machines or under some certain conditions. As an example, especially for offshore wind turbines, generators with plural stator windings are used for big wind turbines. Thereby, each set of the plural stator windings is connected to a separately controlled frequency converter which converts the variable frequency AC power stream received from the generator to a DC power stream and then from the DC power stream to a fixed frequency AC power stream which is then provided to a utility grid. When for example one or more windings of the generator or their converter is broken, mutual inductance between the remaining windings may be changed thereby causing an unbalanced impedance of the remaining stator windings. The unbalanced impedance in turn may cause unbalanced current at the machine stator. As a consequence it may not be possible to fully utilize the converter current rating with an unbalanced stator current. Further, the unbalanced currents may cause extra losses. Furthermore, unbalanced currents may cause high force ripples in the air gap between the permanent magnet rotor and the stator which may excite vibration and noise of the machine. Therefore, balanced machine currents are preferred such that the plural stator currents are all equal.

The current controller may be a component in a sequence of modules which finally control the converter for the plural stator windings. The number of the plural converters may equal the number of the one of more sets of stator windings each stator windings providing for e.g. three different phases. The one or more sets of plural windings supply the electric power flow to the converter(s) during a normal operation of the generator, such as a wind turbine generator. The plural windings (in particular of each set of windings) may for example correspond to three phases or 6 phases.

The plural stator currents may for example be represented by three phase currents, such as $I_a$, $I_b$ and $I_c$. The currents contain both positive-sequence component and negative-sequence component. While the positive-sequence component may be interpreted as a vector rotating in an anti-clockwise manner, the negative-sequence may be interpreted as a vector rotating in a clockwise manner. According to this embodiment of the present invention the positive sequence component and negative-sequence component are separately controlled. In particular, with the negative-sequence component a degree of unbalance of the plural stator currents is obtained and the unbalance is reduced, when the converter is controlled based on the summed voltage command The current controller performs a method for controlling the plural stator currents of the electrical AC machine. Thereby, the current controller or the method performed by the current controller may be used both for machines with balanced impedance and for machines with unbalanced impedance. However, the current controller and the method performed by the current controller may be preferably used in variable speed wind turbines. However, it may be possible to use the method and the current control for other applications like motor drives and electrical cars.

The second voltage command may in particular be derived by the negative-sequence current controller, in order to reduce an unbalance of the plural stator currents. In particular, controlling the converter based on the summed voltage command may result in balanced plural stator currents.

The dq-frame is a particular frame or coordinate system to represent in particular three phase circuits or currents. Thereby, the three AC quantities, such as three phase currents are transformed to two (or three, if a dq0 frame is considered) quantities, which may be pure DC quantities if the three phase currents are balanced. In order to obtain the quantities in the dq-frame a 3×3 (or 2×3) transformation matrix is applied to the three phase currents. Thereby, the d-axis is perpendicular to the q-axis and the d-q-frame rotates with the frequency of the three phase currents according to the first order in an anti-clockwise manner. Thus, the first voltage command may comprise two (or three) components in the dq-frame and also the second voltage command may comprise two components (or three) in the d-q-frame. By the transformation, in particular Park's transformation, the three phase current $I_a$, $I_b$, $I_c$ are transformed into the quantities $I_d$, $I_q$.

According to an embodiment of the present invention the positive-sequence current controller comprises a frame transformation module for transforming the plural stator currents into a current signal in a dq+ frame (also called dq+ current signal) based on an electrical angle of the electrical machine.

The plural stator currents may be represented e.g. by three-phase currents which comprise both a positive sequence component and a negative-sequence component. Both components are converted to a rotating frame (dq+) which rotates with electrical speed of the generator. The three-phase currents (both positive-sequence component and negative-sequence component) are converted to Id+ and Iq+ in the dq+ rotating frame. Thereby, the positive sequence component becomes a dc component in dq+ frame, while the negative sequence becomes a $2^{nd}$ order harmonic in dq+ frame.

The dq+ current signal may comprise at least two components, i.e. a positive sequence component and a negative sequence component, in the dq+ frame. The positive sequence component may be a pure DC signal in this frame and may indicate a magnitude of the plural stator currents, if the three phase current are balanced and without distortion (i.e. the plural stator currents, have the same peak value and have a relative phase difference of 120°. If three phase currents are unbalanced, then the negative current component may become $2^{nd}$ order harmonic in dq+ frame. The amplitude of the $2^{nd}$ order harmonic may be indicative for current unbalance. Thereby, the deviations may be detected and then modified.

Other high order harmonics in three-phase currents become high order harmonics in dq+ frame. For example, the $5^{th}$ and $7^{th}$ harmonic currents in abc frame become $6^{th}$ harmonic in dq+ frame.

According to an embodiment of the present invention the negative-sequence current controller comprises a frame transformation module for transforming the plural stator currents, into a current signal in a dq− frame (also called dq− current signal) based on a negative of an electrical angle of the electrical machine.

The transformation may comprise a transformation into a dq− frame rotating in an opposite direction as the dq+ frame used by the positive-sequence current controller, in particular its frame transformation module.

Thus, while the frame transformation module of the positive-sequence current controller may transform into a dq+ frame rotating in an anti-clockwise manner, the frame transformation module of the negative-sequence current controller may transform into a dq− frame rotating in a clockwise manner The dq− current signal may comprise at least a positive sequence component (which may be second order harmonic in the dq− frame) and a negative sequence component (which may be DC in the dq− frame). An unbalance of the plural stator currents may be indicated by the negative sequence component. Thereby, this unbalance may easily be detected. Furthermore, this enables to counteract the unbalance of the stator current by appropriately controlling the converter.

Similarly as in dq+ frame, there are other high order harmonics in dq− currents which are corresponding to high order harmonics in abc frame.

According to an embodiment of the present invention the positive-sequence current controller comprises a filter, in particular adaptive filter having as an input a electrical frequency of the generator, for generating a filtered dq+ current signal, in which AC-components, in particular AC-components corresponding to harmonics of the multiple of generator electrical frequency, are reduced in amplitude.

The filter may be or may be an electronic filter or software implemented filter. The filter may have transmission characteristics which may be adapted according to the frequency of the plural stator currents. The filter of the positive-sequence current controller may for example filter out or damp AC-components having a frequency of two times, three times, four times, five times, six times or more times the electrical frequency of the generator. Thereby, subsequent process of the dq+ current signal may be simplified and regulation may be enabled.

According to an embodiment of the present invention the negative-sequence current controller comprises a filter, in particular adaptive filter having as an input the electrical frequency of the generator, for generating a filtered dq− current signal, in which AC-components, in particular AC-components corresponding to harmonics of multiple generator electrical frequency, are reduced in amplitude.

Also the filter of the negative-sequence current controller may be an electronic filter or software implemented filter. The characteristics of the filter of the negative-sequence current controller may be adapted or changed depending on the electrical frequency of the generator. The filter of the negative-sequence current controller may for example filter out or damp AC-components in the dq− current signal which correspond or have frequencies of two times, three times, four times, five times, six times or more times the generator electrical frequency. Thereby, further process and regulation may be enabled.

According to an embodiment of the present invention a filter characteristics, such as a transmission characteristics, of the filter of the negative-sequence current controller and/or the positive-sequence current controller is adaptable according to the electrical frequency of the generator.

After filtering the filtered dq+ current signal and/or the filtered dq− current signal may be substantially a DC-signal which may more clearly indicate whether there is an unbalance of the plural stator currents.

According to an embodiment of the present invention the positive-sequence current controller comprises two regulators, in particular PI-controllers, for generating a dq+ voltage signal based on the filtered dq+ current signal and a positive-sequence current reference in dq+ frame received as further input. The regulator may generate the dq+ voltage signal so that the positive-sequence stator currents are following the positive-sequence current reference signal.

According to an embodiment of the present invention the negative-sequence current controller comprises two regulators, in particular PI-controllers, for generating a dq− voltage signal based on the filtered dq− current signal and a negative-sequence current reference in dq+ frame received as further input.

The regulator of the negative-sequence current controller may derive or generate the dq− voltage signal so that the negative-sequence stator currents are following the negative current reference signal. In particular, the negative current reference signal may be substantially zero. In particular, the negative current reference signal may comprise two components in the dq− frame which are both substantially zero.

According to an embodiment of the present invention the positive-sequence current controller comprises a voltage feedforward module for generating a feedforward dq+ voltage signal based on the dq+ current reference signal received as further input and based on the electrical frequency of the generator.

The voltage feedforward module may improve the dynamic performance of the controller and decouple components in the d-axle and the q-axle.

According to an embodiment of the present invention the positive-sequence current controller comprises an addition system for generating the first voltage command based on the feedforward dq+ voltage signal and the dq+ voltage signal output by the regulators.

According to an embodiment of the present invention the negative-sequence current controller comprises a voltage feedforward module for generating a feedforward dq− voltage signal based on the dq− current reference signal received as further input and based on the electrical frequency of the generator.

The feedforward module of the negative-sequence current controller may improve the dynamic performance of the controller and decouple components in the d-axle and the q-axle.

According to an embodiment of the present invention the negative-sequence current controller comprises an addition system for generating a summed dq− voltage signal based on the feedforward dq− signal and the dq− voltage signal output by the regulators.

According to an embodiment of the present invention the negative-sequence current controller comprises a reverse frame transformation module for generating the second voltage command, in particular according to reverse Park transformation with two times the electrical angle, signal based on the summed dq− voltage signal. The purpose of the reverse frame transformation is to convert voltage from dq− frame to dq+ frame.

According to an embodiment of the present invention the current controller further comprises a transformation module for transforming the summed voltage command from rotating dq+ frame to stationary three phase frame or two phase frame, and a modulator to modulate the three phase frame command according to the DC-link voltage of the converter.

The modulator may supply the modulated three phase command to the converter.

The current controller may receive the positive current reference signal and the negative current reference signal from a current reference calculation module which in turn receives as input or inputs a reference power, a reference torque, a voltage of the generator, a voltage of the DC-link, a frequency, a power and a torque.

According to an embodiment of the present invention it is provided a generator system comprising a generator having at least one (in particular two or more) stator segment annularly arranged, each stator segment having plural stator windings; at least one converters (one converter for each stator segment, if there are more than one stator segment), wherein the plural stator windings of each of the at least one stator segments are connectable to a corresponding converter of the at least one converter; at least one current controller (one for each converter) according to an embodiment as described above, wherein each current controller is connectable to a corresponding converter of the at least one converter, wherein the generator is in particular a variable frequency generator, wherein the converter is in particular a AC-DC-AC converter.

The generator may have a single stator forming a full circumference and may have one or more sets of plural stator windings, each set having e.g. three stator windings providing three phases.

In particular, the generator may have at least two plural stator windings or two or more sets of stator windings, each set in particular belonging to a particular stator segment or the two ore more sets belonging to a single stator forming the full circumference. Further, the generator system may comprise at least two converters, wherein the plural stator windings of each set of stator windings are connectable to a corresponding converter of the at least two converters. Further, the generator system may comprise at least two current controllers according to an embodiment as described above, wherein each current controller is connectable to a corresponding converter of the at least two converters. Thereby in particular, if one set of stator windings or its converter fails, it may be ensured that the remaining stator windings of the remaining set or sets have balanced stator currents. Thereby, the operation of the generator system may be improved, in particular regarding efficiency and noise reduction.

Embodiments of the present invention are now described with reference to the accompanying drawings. The invention is not restricted or limited to the illustrated or described embodiments.

DETAILED DESCRIPTION

Figure 1:
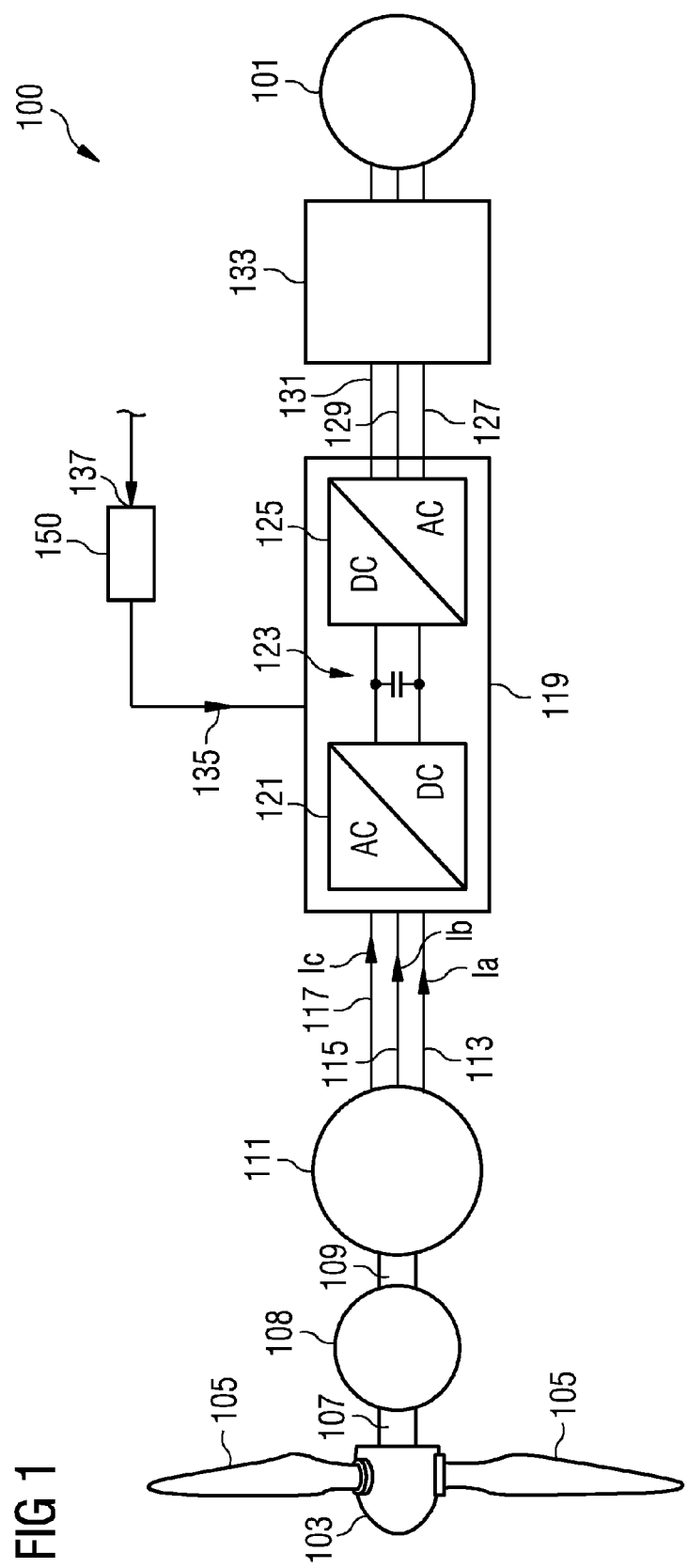
FIG. 1 schematically illustrates a wind turbine having a generator having single three-phase stator winding (a single set of stator windings) including a current controller according to an embodiment of the present invention.

FIG. 1 illustrates in a schematic form a wind turbine 100 which provides electric energy to a utility grid 101.

The wind turbine comprises a hub 103 to which plural rotor blades 105 are connected. The hub is mechanically connected to a main shaft 107 whose rotation is transformed by a gear box 108 to a rotation of a secondary shaft 109, wherein the gear box 108 may be optional. The main shaft 107 or the secondary shaft 109 drives a generator 111 which may be in particular a synchronous permanent magnet generator providing a power stream in the three phases or windings 113, 115 and 117 to a converter 119 which comprises a AC-DC portion 121, a DC-link 123 and a DC-AC portion 125 for transforming a variable AC power stream to a fixed frequency AC power stream which is provided in three phases or windings 127, 129, 131 to a wind turbine transformer 133 which transforms the output voltage to a higher voltage for transmission to the utility grid 101.

The converter 119 is controlled via a converter command 135 which is derived and supplied from a current controller 150 according to an embodiment of the present invention, which receives at least one input signal 137, such as one or more reference values or one or more quantities indicative of the operation of the generator 111 or any component of the wind turbine 100.

The generator in FIG. 1 comprises a single three-phase stator winding. Thereby, the winding 113 carries the stator current $I_a$, the winding 115 carries the stator current $I_b$ and the winding 117 carries the stator current $I_c$.

The current controller 115 controls the converter 119 such that generator voltage and power follow commands and the stator current $I_a$, $I_b$ and $I_c$ are balanced.

Figure 2:
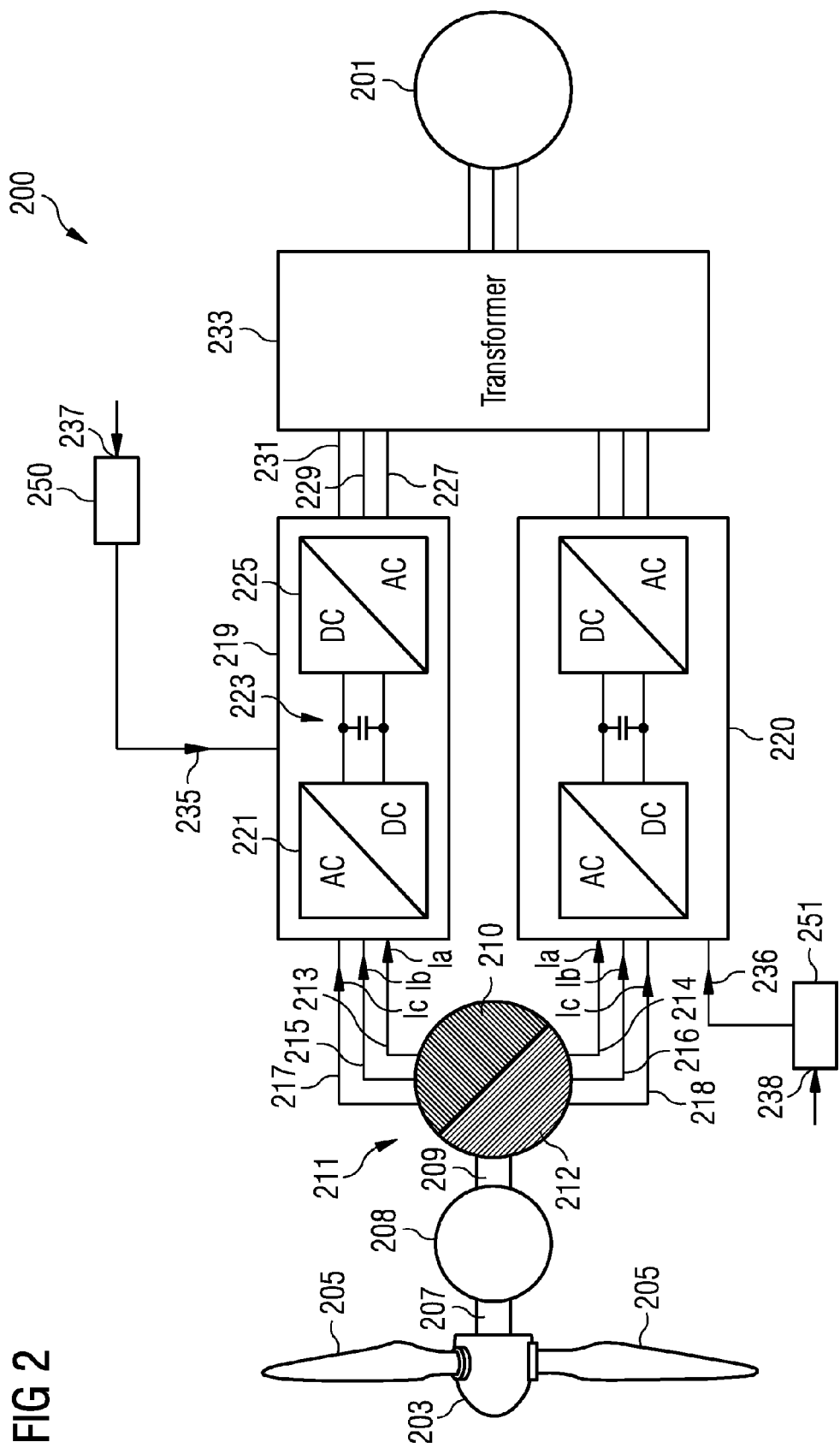
FIG. 2 schematically illustrates a wind turbine having a dual three-phase generator (having two sets of stator windings) and two corresponding current controllers according to an embodiment of the present invention.

FIG. 2 illustrates in a schematic form another wind turbine 200 which is connected for energy supply to the utility grid 201. If not otherwise stated components being equal in structure and/or function in FIGS. 1 and 2 are denoted with the same reference sign differing only in the first digit. Thus, a description of elements not described with reference to FIG. 2 may be taken from the description of these elements as described in FIG. 1.

Differing from the embodiment illustrated in FIG. 1 the generator 211 of the wind turbine 200 illustrated in FIG. 2 comprises the first set of three-phase windings 210 and the second set of three-phase windings 212, wherein the first set of windings 213, 215, 217 provides the power flow to a first converter 219. Further, the second set of windings 214, 216 and 218 provides the power stream to a second converter 220 which may be similarly constructed as the first converter 219. Thereby, the first converter 219 is controlled via a current controller 250 by providing a converter command 235 to the first converter 219 based on at least one input signal 237. Further, the second converter 220 is controlled via a converter command 236 supplied by another current controller 251 according to an embodiment of the present invention which receives at least one input signal 238.

The current controllers 250, 251 control the first converter 219 and the second converter 220, respectively, such that the currents, carried by the different windings 213, 215, 217 and 214, 216, 218, are balanced.

Figure 3:
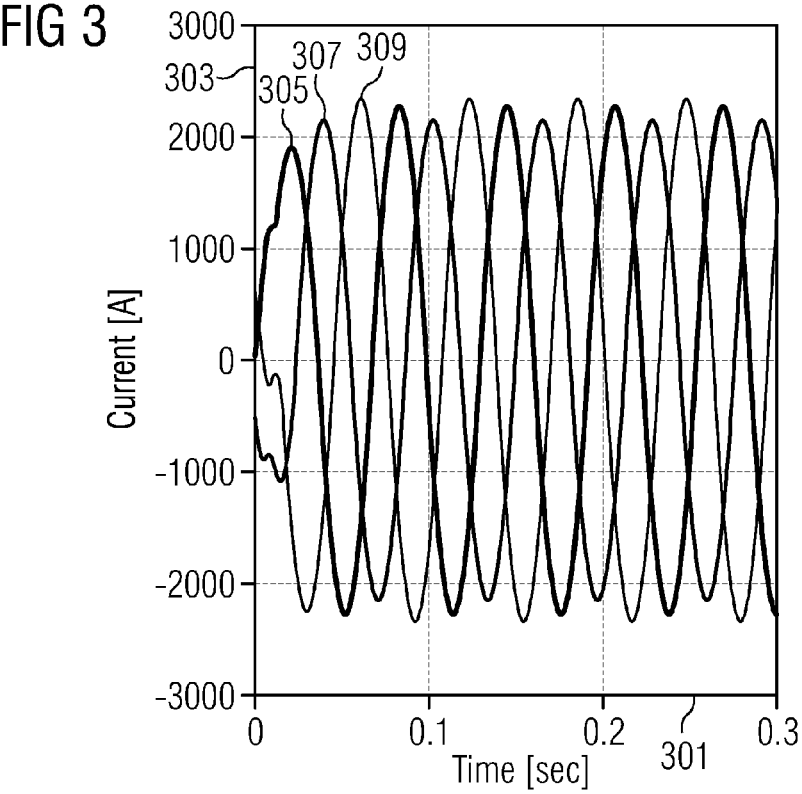
FIG. 3 illustrates a graph depicting unbalanced phase currents of a generator with unbalanced impedance.

FIG. 3 illustrates graphs of the stator currents flowing in three stator windings of a generator with unbalanced impedance. An abscissa 301 denotes the time and seconds, and an ordinate 303 denotes the current flowing through the respective windings in Ampere. The curve 305 represents the stator current of a first phase, the curve 307 represents the stator current of a second phase and the curve 309 represents the stator current of a third phase. As is apparent from FIG. 3 the peak values of the curves 305, 307 and 309 are different indicating that the currents or stator currents of the different phases are not balanced. Thereby, there may evolve losses and a deterioration of the efficiency. Further, oscillations may evolve increasing the noise emissions which may be undesirable.

Figure 4:
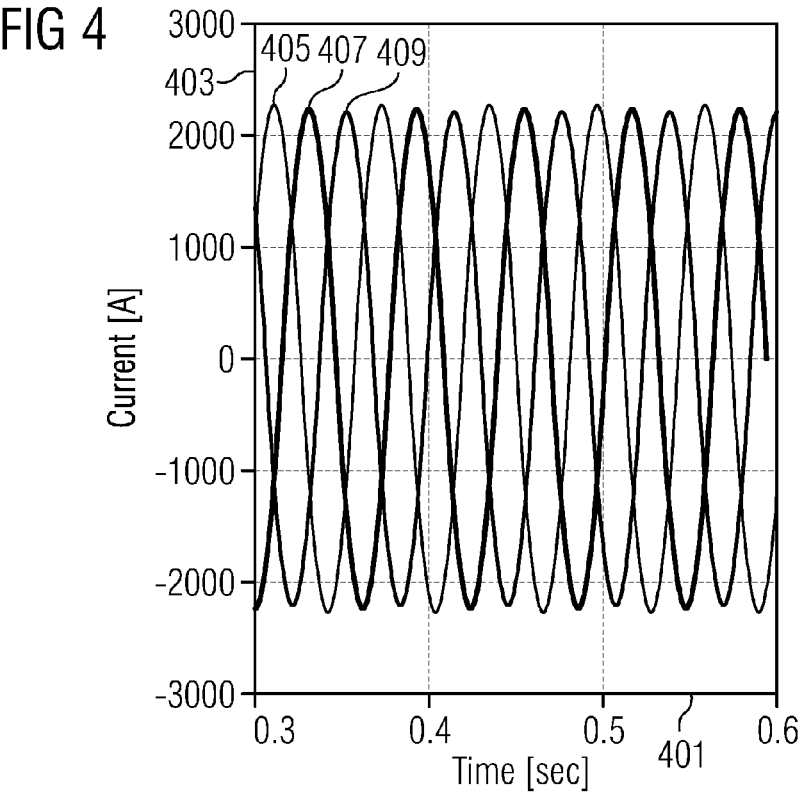
FIG. 4 illustrates a graph showing phase currents of a generator controlled using a current controller according to an embodiment of the present invention.

FIG. 4 shows in comparison curves of stator currents when the converter is controlled using a current controller according to an embodiment of the present invention.

An abscissa 401 denotes the time in seconds, while an ordinate 403 denotes the stator current in Ampere. The curve 405 represents the stator current of a first phase, such as the winding 113 or 213 as shown in FIG. 1 or 2. The curve 407 represents a stator current of a second phase such as of the winding 115 or 215 as shown in FIG. 1 or 2. The curve 409 represents a stator current of a third phase, such as of the winding 117 or 217 as shown in FIG. 1 or 2. As can be appreciated from FIG. 4, the peak values of the curves 405, 407, 409 are at least approximately equal, indicating that the stator current of these different phases are balanced.

The balancing of the stator currents is achieved by controlling the respective converter using a current controller, such as current controller 150, 250 or 251, according embodiments of the present invention.

Figure 5:
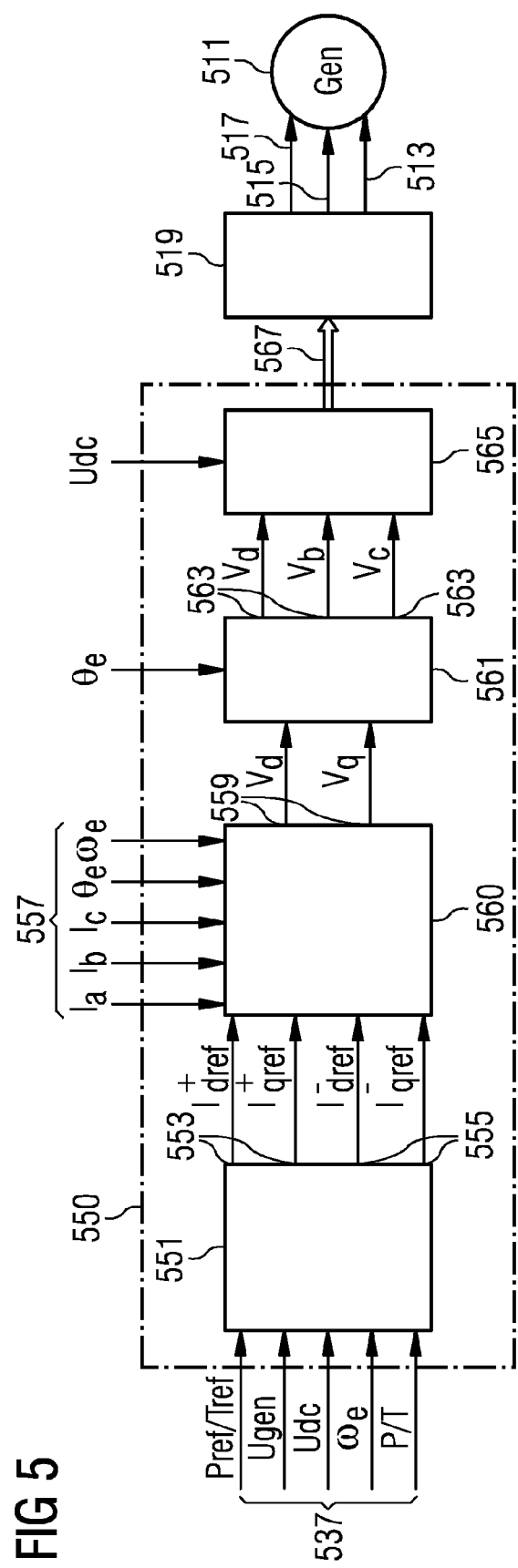
FIG. 5 illustrates a control system including a current controller according to an embodiment of the present invention and a converter and a generator, wherein in particular a generator system according to an embodiment of the present invention is formed.

FIG. 5 schematically illustrates a current control system 550 including a current controller 560 according to an embodiment of the present invention. The current control systems 150, 250 and 251 illustrated in FIGS. 1 and 2 may for example be implemented as the current control system 550 illustrated in FIG. 5.

The current control system 550 receives as input quantities 537 a reference power Pref, a reference torque Tref, the voltage Ugen of the generator, the voltage Udc at the DC-link of the converter, the electrical frequency $\omega_e$ of the generator and the power P and the torque T of the generator. These input quantities 537 are supplied to a current reference calculation module 551 which calculates based on the input qualities 537 positive sequence current reference signals 553 in the dq+ frame and negative sequence current reference signals 555 in the dq− frame.

These references are provided to the current controller 560 according to an embodiment of the present invention which further receives the stator current $I_a$, $I_b$, $I_c$ and the electrical phase $\Theta_e$ and the frequency $\omega_e$ of the generator as inputs 557. The current controller 560 outputs a summed voltage command 559 having a component $V_d$ and another component $V_q$ in the dq+ frame. The summed voltage command 559 is provided to a transformation module 561 for transforming the summed voltage command (based on the received electrical phase $\Theta_e$) into a three phase frame command 563 comprising the components $V_a$, $V_b$ and $V_c$. The three phase frame command 563 is supplied to a modulator 565 which receives the voltage Udc of the DC-link of the converter and provides a modulated signal 567 to the converter 519 which is connected to the generator 511, as is also illustrated in FIGS. 1 and 2. In particular, the current controller 560 comprised in the current control system 550 enables to control the converter 519 such that the stator currents flowing in the windings 513, 515 and 517 to be balanced.

Figure 6:
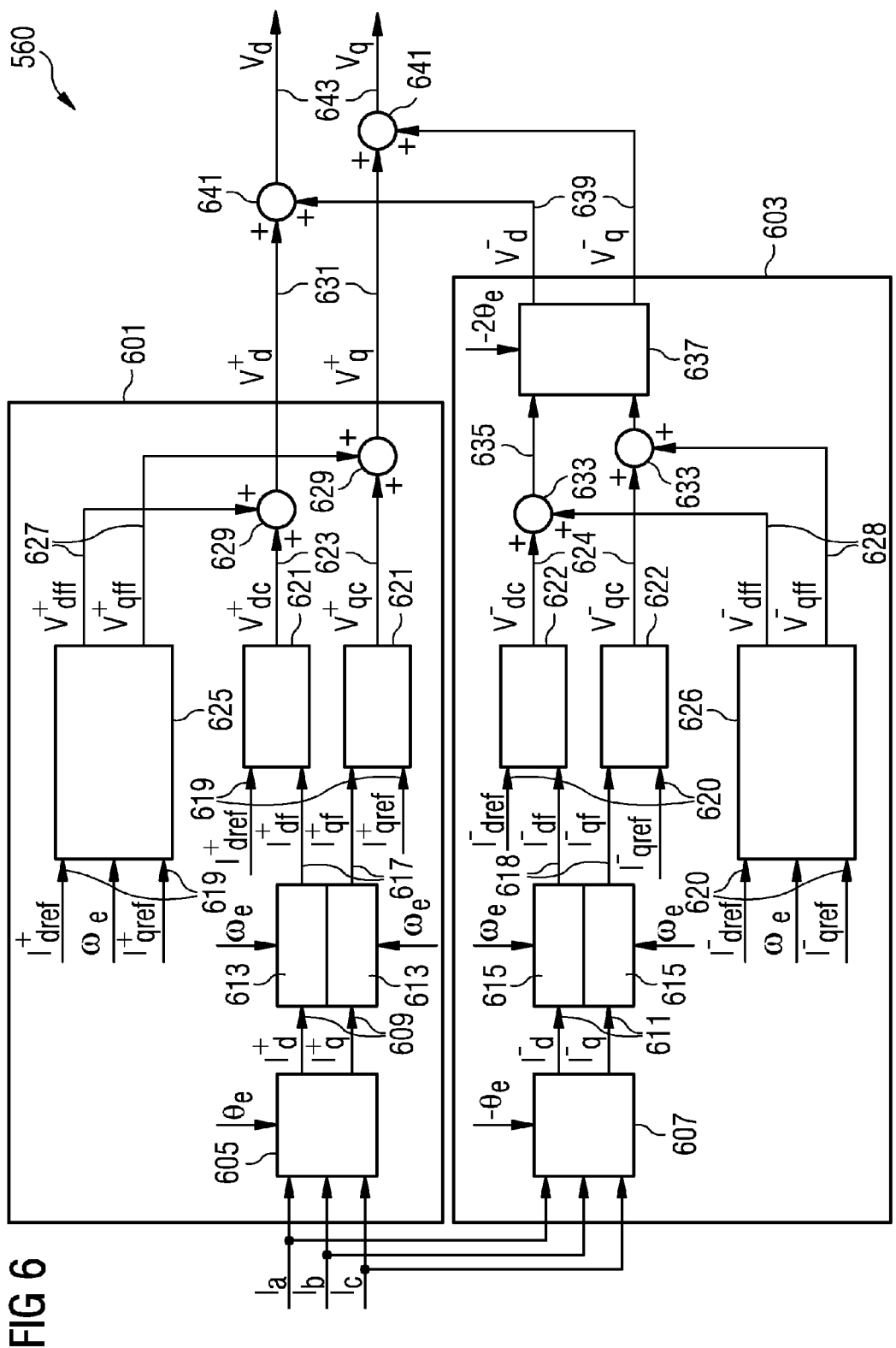
FIG. 6 schematically illustrates a detailed view of a current controller according to an embodiment of the present invention.

FIG. 6 schematically illustrates the current controller 560 illustrated in FIG. 5 in some more detail. The current controller 560 comprises a positive-sequence current controller 601 and a negative-sequence current controller 603 which separately regulate the positive-sequence component of the stator current and the negative-sequence component of stator current. The positive-sequence current controller and the negative-sequence current controller both receive the same three-phase currents, but the process and regulators are different.

The positive-sequence controller comprises a frame transformation module 605 and the negative-sequence current controller comprises a frame transformation module 607. These frame transformation modules 605 and 607 are provided to transform the three phase input signal comprising the stator currents from stationary three-phase frame into rotationary dq+ and dq− frames, respectively, i.e. into a dq+ current signal 609 and a dq+current signal 611, respectively.

Thereby, the frame transformation module 605 of the positive-sequence current controller receives the electrical phase $\Theta_e$ for the transformation, while the frame transformation module 607 of the negative-sequence current controller receives the negative of the electrical phase, i.e. $-\Theta_e$, i.e. the angle of generator back emf (The frequency of back emf is the same as generator current). Thus, the frame transformation module 605 transforms in a dq+ frame rotating in an anti-clockwise manner and the frame transformation module 607 transforms in a dq− frame rotating in a clockwise manner.

The dq+ current signal 609 is supplied to a filter system 613 comprising two filter components, one for each component of the dq+ current signal 609. The filter system 613 is an adaptive filter which receives the frequency $\omega_e$ of the generator and adapts according to this frequency its transmission behavior. In particular, the filter system 613 filters out AC-components of the dq+ current signal 609 which correspond to harmonics at the multiple of frequency $\omega_e$ of the generator.

Also the negative-sequence current controller 603 comprises a filter system 615 comprising two filter components for each component of the dq− current signal 611, in order to filter out higher harmonics of the frequency $\omega_e$ of the generator.

The filtered dq+ current signal 617 is provided together with a positive-sequence current reference signal 619 to a regulator 621, which may in particular comprise a PI-controller which adjusts a dq+ voltage signal 623 in order to regulate idq+ to comply with the positive-sequence current reference signal 619.

Also the negative-sequence current controller comprises a regulator 622 (for each component) which receives a negative-sequence current reference signal 620 and the filtered dq− current signal 618 output by the filter system 615 in order to derive a dq− voltage signal 624. Both, the positive-sequence current controller and the negative-sequence current controller comprise a voltage feedforward module 625 and 626, respectively for generating a dq+ feedforward voltage signal 627 based on the positive-sequence current reference signal 619 and on the frequency $\omega_e$ of the generator. The voltage feedforward module 626 of the negative-sequence current controller 603 generates a feedforward dq− voltage signal 628 based on the negative-sequence current reference signal 620 and the frequency $\omega_e$ of the generator.

Further, the positive-sequence current controller comprises adding elements 629 for adding the feedforward dq+ voltage signal 627 and the dq+ voltage signal 623 to generate the first voltage command 631.

The negative-sequence current controller 603 comprises adding elements 633 to generate a summed dq− voltage signal 635 based on the feedforward dq− voltage signal 628 and the dq− voltage signal 624 output by the regulator 622. Further, the negative-sequence current controller 603 comprises a reverse frame transformation module 637 to transform (based on twice the negative of the electrical angle, i.e. $-2\Theta_e$) the summed dq− voltage signal 635 to the second voltage command 639.

Using adding elements 641 the first voltage command 631 generated by the positive-sequence current controller 601 is added to the second voltage command 639 generated by the negative-sequence current controller 603, in order to obtain a summed voltage command 643 having component $V_d$ and $V_q$ which are then supplied to a converter, such as a converter 519 illustrated in FIG. 5 or converter 119 illustrated in FIG. 1 or converter 219 or converter 220 illustrated in FIG. 2.

In particular, the current controller 560 illustrated in FIGS. 5 and 6 is a closed-loop feedback regulation of machine current in dq frame. For a better dynamic performance, voltage feedforward is also used in this block 560. In particular, the current controller 560 comprises the fundamental positive-sequence current controller 601 which is configured for providing the first voltage command, i.e. voltage command $V^+_d$, $V^+_q$ and any fundamental negative-sequence current controller 603 configured for using negative current reference, current feedback signal and machine speed in combination with $I_d$ regulator, $I_q$ regulator and voltage feedforward to obtain the second voltage command 639, i.e. the component $V^-_d$, $V^-_q$. Thereby, the positive-sequence current controller is in the synchronous dq+ frame $+\omega_e$. In contrast, to regulate the negative-sequence current, the three phase current $I_a$, $I_b$, $I_c$ is converted to a rotating frame (dq− frame) with $-\omega_e$ by Park's transformation. The fundamental negative-sequence current is converted from AC to DC after the transformation. A PI-controller can be used to regulate the negative current following their references in this rotating frame. For achieving better dynamic performance, voltage feedforward is also used in this rotating frame. The output of the voltage feedforward and the feedback current controller are added together, and then they are converted to the synchronous dq+ frame.

The negative-sequence current is the second order harmonic in dq+ frame. The current regulators in positive-sequence current controller shall not give response to negative-sequence current. Therefore, the filter system 613 is used to remove harmonics in the current feedback in dq+ frame Similarly, positive-sequence current is second order harmonic in the dq− frame. Filter system 615 is then used to remove harmonics in the dq− frame. The two voltage feedforward blocks 625 and 626 in both the positive-sequence current controller and negative-sequence current controller are used to calculate decoupling voltages between the d-axis and q-axis at the two rotating frames based on generator models. Machine impedance values like resistance and inductance are used together with electrical speed and current references for this calculation.

The current controller of the present invention may contribute to minimizing unbalanced currents of an electrical machine and converter, may reduce machine and converter losses, may reduce acoustic noise and vibration of the machine, may not have any additional costs and may not require any changes in hardware.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. Current controller for controlling plural stator currents of plural stator windings of an electric machine, wherein the plural stator windings are separately connectable to a converter, the current controller comprising:
   a positive-sequence current controller configured to provide a first voltage command in a dq+ frame based on the plural stator currents;
   a negative-sequence current controller configured to provide a second voltage command in the dq+ frame based on the plural stator currents;
   a summation system for adding the first voltage command and the second voltage command to obtain a summed voltage command, wherein the converter is controlled based the summed voltage command.

2. Current controller according to claim 1, wherein the positive-sequence current controller comprises a frame transformation module for transforming the plural stator currents into a current signal in the dq+ frame based on an electrical angle of the electrical machine.

3. Current controller according to claim 1, wherein the negative-sequence current controller comprises a frame transformation module for transforming the plural stator currents into a current signal in a dq− frame based on a negative of an electrical angle of the electrical machine.

4. Current controller according to claim 1, wherein the positive-sequence current controller comprises an adaptive filter, having as an input an electrical frequency of the electric machine, for generating a filtered dq+ current signal, wherein AC-components corresponding to harmonics of a multiple of the electrical frequency are reduced in amplitude.

5. Current controller according to claim 1, wherein the negative-sequence current controller comprises an adaptive filter, having as an input an electrical frequency of the electric machine, for generating a filtered dq− current signal, wherein AC-components corresponding at multiple of the electrical frequency are reduced in amplitude.

6. Current controller according to claim 4, wherein filter characteristics of the filter of the positive-sequence current controller are adaptable according to the electrical frequency of the electric machine.

7. Current controller according to claim 5, wherein filter characteristics of the filter of the negative-sequence current controller are adaptable according to the electrical frequency of the electric machine.

8. Current controller according to claim 1, wherein the positive-sequence current controller comprises a PI-controller for generating a dq+ voltage signal based on the filtered dq+ current signal and a positive-sequence current reference signal received as further input.

9. Current controller according to claim 3, wherein the negative-sequence current controller comprises a PI-controller for generating a dq− voltage signal based on the filtered dq− current signal and a negative-sequence current reference signal received as further input.

10. Current controller according to claim 8, wherein the positive-sequence current controller comprises a voltage feed forward module for generating a feed forward dq+ voltage signal based on the positive-sequence current reference signal received as further input and based on electrical frequency of the electric machine.

11. Current controller according to claim 10, wherein the positive-sequence current controller comprises an addition system for generating the first voltage command based on the feed forward dq+ voltage signal and the dq+ voltage signal output by the PI-controller.

12. Current controller according to claim 9, wherein the negative-sequence current controller comprises a voltage feed forward module for generating a feed forward dq− voltage signal based on the negative-sequence current reference signal received as further input and based on the electrical frequency of the electric machine.

13. Current controller according to claim 12, wherein the negative-sequence current controller comprises an addition system for generating a summed dq− voltage signal based on the feed forward dq− voltage signal and the dq− voltage signal output by the regulator.

14. Current controller according to claim 13, wherein the negative-sequence current controller comprises a reverse frame transformation module for generating the second voltage command as a reverse transformed signal based on the summed dq− voltage signal.

15. Current controller according to claim 14, wherein the second voltage command is generated as a reverse transformed signal according to a negative-sequence of two times the electrical angle.

16. Current controller according to claim 1, further comprising:
a transformation module for transforming the summed voltage command from rotating dq+ frame to stationary three phase frame or two phase frame command; and
a modulator for modulating a three phase frame command according to a DC-voltage at a DC-link of the converter.

17. Generator system, comprising:
a generator with at least one set of plural stator windings;
at least one converter, wherein the at least one set of plural stator windings is connectable to the at least one converter;
at least one current controller according to claim 1, wherein the current controller is connectable to the at least one converter,
wherein the generator is a variable frequency generator, and wherein the converter is a AC-DC-AC converter.

* * * * *